United States Patent [19]

Ono et al.

[11] 4,136,894
[45] Jan. 30, 1979

[54] GAS GENERATOR FOR INFLATABLE VEHICLE SAFETY BAGS

[75] Inventors: Koichi Ono; Toshiyuki Takahara, both of Tatsuno; Tetsuyoshi Ito, Hyogo, all of Japan

[73] Assignee: Daicel Ltd., Sakai, Japan

[21] Appl. No.: 819,917

[22] Filed: Jul. 28, 1977

[30] Foreign Application Priority Data

Jul. 29, 1976 [JP] Japan ................................. 51-90569

[51] Int. Cl.² ............................................. B60R 21/08
[52] U.S. Cl. ..................................... 280/729; 102/40; 280/740; 280/741
[58] Field of Search ............... 280/729, 734, 735, 736, 280/737, 738, 739, 740, 741, 742; 102/40

[56] References Cited

U.S. PATENT DOCUMENTS

| | | | |
|---|---|---|---|
| 3,758,131 | 9/1973 | Stephenson | 280/735 |
| 3,767,225 | 10/1973 | Mazelsky | 280/729 |
| 3,773,352 | 11/1973 | Radke | 280/741 X |
| 3,787,074 | 1/1974 | Lewis | 280/741 |
| 3,827,715 | 8/1974 | Lynch | 280/741 X |
| 3,944,251 | 3/1976 | Lynch | 280/731 |
| 3,972,545 | 8/1976 | Kirchoff | 280/741 |
| 3,985,076 | 10/1976 | Schneiter | 280/741 X |
| 4,017,100 | 4/1977 | Gehrig | 280/736 |
| 4,021,275 | 5/1977 | Kishi | 280/741 X |
| 4,049,904 | 9/1977 | Hori | 428/215 X |

*Primary Examiner*—John P. Silverstrim
*Attorney, Agent, or Firm*—Sughrue, Rothwell, Mion, Zinn and Macpeak

[57] ABSTRACT

A gas generator for inflatable vehicle safety bags comprises a housing defining three independent chambers each containing a charge of gas generating agent in a sealed wrapper surrounding an electrical ignition squib, and layers of heat absorbing wire gauze, a porous plate, and sintered filter sheets overlying the charge. The open top of each chamber is covered by an apertured diffuser, and an apertured deflector plate is secured to the housing above the diffusers. Generated gases passing through the apertures in the deflector plate inflate a relatively small inner knee bag, and laterally diverted gases inflate a larger outer torso bag surrounding the knee bag.

The inflation impact may be minimized by delaying the ignition of one or more chambers relative to the other(s), and by igniting only selected chambers in response to low speed collisions.

9 Claims, 3 Drawing Figures

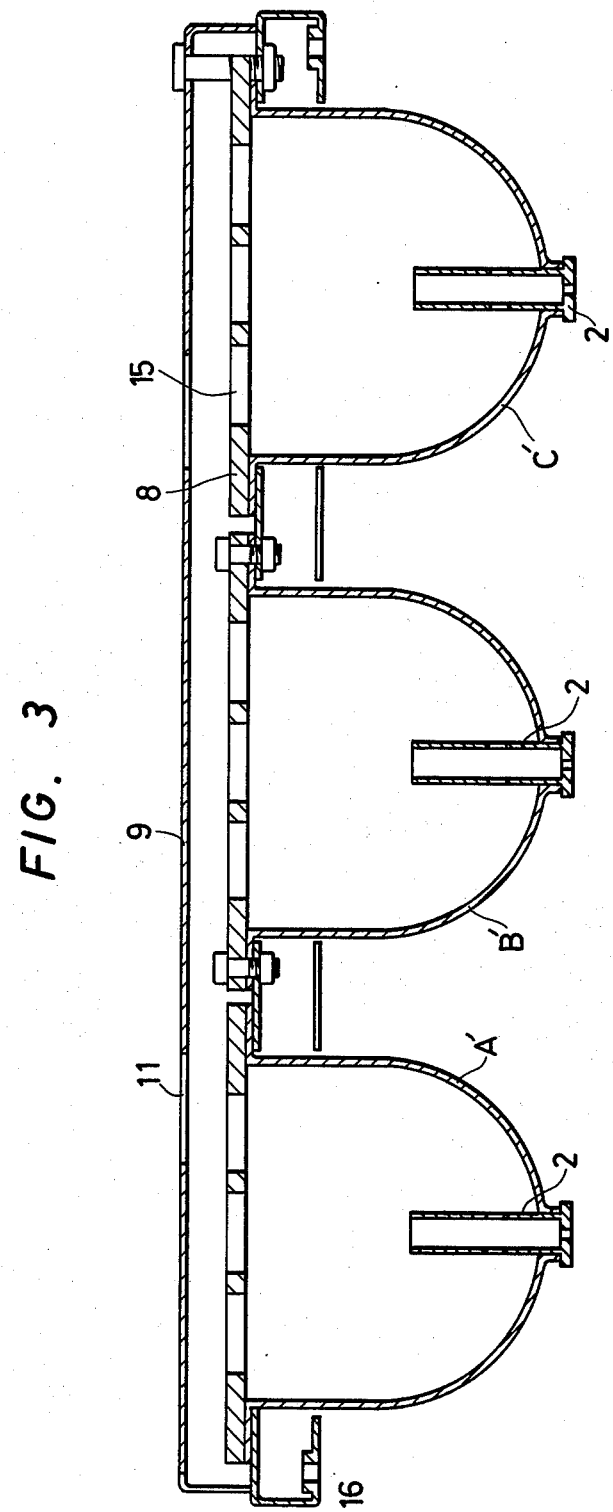

GAS GENERATOR FOR INFLATABLE VEHICLE SAFETY BAGS

BACKGROUND OF THE INVENTION

This invention relates to a gas generator for an inflatable vehicle safety bag mounted proximate the front passenger seat next to the driver for protecting the passenger from collision impacts.

A variety of so-called hybrid type gas generators have been proposed for inflatable passenger safety bags, in which high pressure gas in a canister bomb is released by firing a squib, and wherein the quantity of gas is increased by the gases produced by the squib and the heat expansion caused thereby. Gas generators of this type involve complex mechanisms, however, and it is difficult to perform maintenance checks such as for gas leaks. Furthermore, such generators are bulky and heavy, and are thus poorly adapted for use in small automobiles. It is also a requirement that a child, an elderly person, or a woman holding a child in the passenger seat suffer no injury when the safety bag is inflated. This requirement is best met by minimizing or relieving the inflation impact of the bag, which is difficult to implement with the hybrid type gas generators of the prior art.

SUMMARY OF THE INVENTION

The present invention overcomes these problems and shortcomings by providing a gas generator comprising a housing defining three independent chambers each containing a charge of gas generating agent in a sealed wrapper surrounding an electrical ignition squib, and layers of heat absorbing wire gauze, a porous plate, and sintered filter sheets overlying the charge. The open top of each chamber is covered by an apertured diffuser, and an apertured deflector plate is secured to the housing above the diffusers. Generated gases passing through the apertures in the deflector plate inflate a relatively small inner knee bag, and laterally diverted gases inflate a larger outer torso bag surrounding the knee bag.

The inflation impact may be minimized by delaying the ignition of one or more chambers relative to the other(s), and by igniting only selected chambers in response to low speed collisions.

BRIEF DESCRIPTION OF THE DRAWINGS

In the drawings:

FIG. 3 shows a longitudinal cross-sectional view of an alternate gas generator embodiment.

DETAILED DESCRIPTION OF THE PREFERRED EMBODIMENTS

Figure 1:
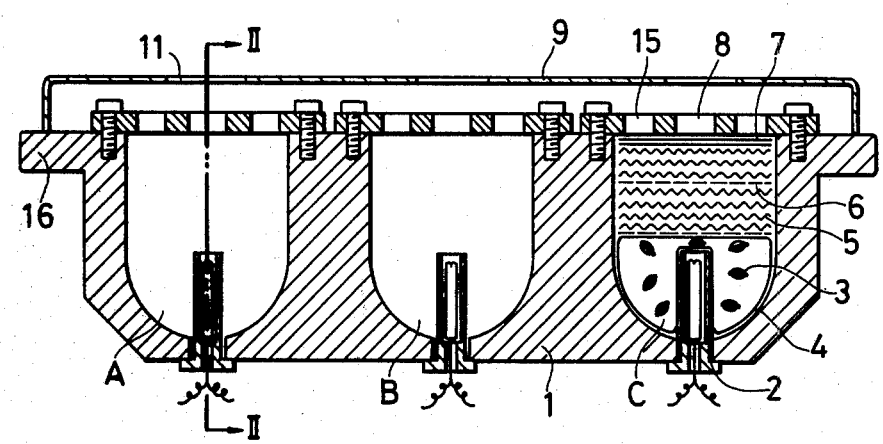
FIG. 1 shows a longitudinal cross-sectional view of a gas generator constructed in accordance with the present invention, with the inflatable gas bags removed.
Figure 2:
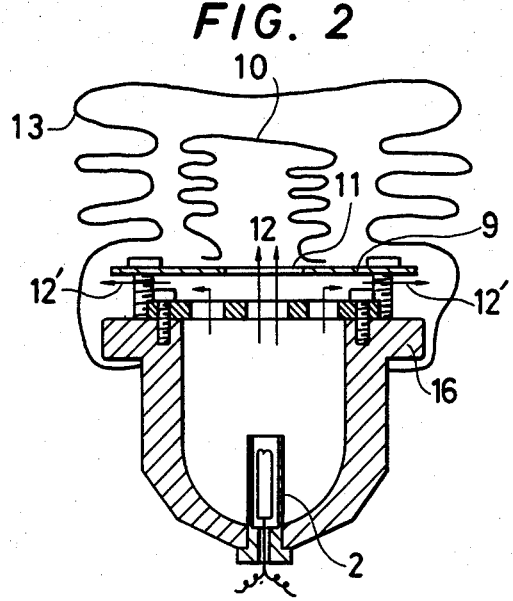
FIG. 2 shows a cross-sectional view taken along line II—II of FIG. 1.

Referring to FIGS. 1 and 2, a generator housing 1 includes three chambers A, B, C within a unitary block, each being cylinder shaped in the top, open portion and semispherical in the bottom portion. An electrical ignition squib 2 is mounted in the central bottom portion of each chamber and is surrounded by a gas generating agent covered by heat absorbing layers 5, 6 and filter layers 7. A diffuser 8 having nozzle openings 15 is fastened to the upper peripheral wall of each chamber over the top opening thereof. The gas generating agent is in the form of tablets 3 sealingly enclosed in a rupturable wrapper 4 containing a central blind aperture for receiving the squib 2. A deflector plate 9 is attached to the housing above the diffusers 8, and is arranged such that a major portion of the gases exiting through the diffuser nozzles impinge on the deflector plate and are laterally diverted to form side gas streams 12' which inflate a torso bag 13. The remaining gas streams 12 passing through holes 11 in the deflector plate serve to inflate a knee bag 10.

The knee bag 10 is secured to the deflector plate, and the torso bag 13 is attached to the peripheral flange portion 16 of the generator housing 1.

Alternatively, the generator housing may be formed as an assembly of three independent containers A', B' and C', as shown in FIG. 3.

The above-described construction enables the course of the gas streams produced to be controlled to minimize the frontward inflation or unfolding speed of the bag, thereby relieving the impact exerted on the passenger. That is, the provision of three separate gas generating chambers allows a two-stage operation whereby the quantity of gas may be reduced at the initial stage, which diminishes the unfolding impact. The period of time from initiation to complete inflation is freely adjustable within an approximate range of from 30 to 60ms by varying the combustion pressure of the gas generating agent and the interval between the first and second stage ignitions. Further, the maximum pressure within the inflated bags is freely adjustable within a range of from 0 to $0.9 kg/cm^2$ by properly selecting the quantity of gas generating agent, the quantity of heat radiating material, and the lag between the first and second stage ignitions. If an appropriate impact sensor is used to control the electrical ignition, then only first or primary stage operation of the gas generator may be implemented in response to low speed collisions, such as at 15 mph (24kph), thus further minimizing any inflation impact.

The gas generating agent should preferably consist of a mixture containing one or more of an alkali metal azide or an alkaline earth metal azide, one or more of a nitrate or perchlorate of alkali metal or alkaline earth metal, fine particulate silicon dioxide, and fine particulate glass. The composition of the mixture and the process for producing it are disclosed in applicant's USP 4,021,275. A mixture essentially containing sodium azide and potassium perchlorate as the oxide is particularly preferable. The above gas generating mixture produces gases essentially containing nitrogen in an innocuous form. The generating agent may be in the form of tablets, either unwrapped or sealingly wrapped in a moisture-proof cartridge, preferably metal foil having at least one surface coated with a synthetic, thermoplastic resin.

The heat absorbing materials comprise sheets of wire gauze 5 laminated one upon another, with a porous plate 6 disposed at a substantially equal spacing between them. The laminated sheets are preferably 10 to 30 mesh wire gauze, and the porous plate may have a thickness of about 0.5mm and a perforation ratio of 30 to 60%. The filtering material 7 is preferably a sintered metallic body obtained by placing stainless steel fibers $8\mu$ in mean diameter on one surface of a sheet of 14 to 22 mesh stainless steel wire gauze at a density of 500 to $1,500 g/m^2$, and then subjecting same to sintering.

EXAMPLE 1

An inflation test was carried out for the gas bags, using the generator shown in FIG. 1, with three chambers made up as described below and simultaneously ignited.

121grs. of gas generating agent was charged in each chamber. The laminations of wire gauze and the porous plate were superposed in 7 layers above the generating agent, each lamination consisting, in order from the bottom of the chamber, of two sheets of 14 mesh wire gauze, a single porous plate having a perforation ratio of 50%, and three sheets of 18 mesh wire gauze. Two filter sheets of sintered metallic fiber were placed above the heat absorbing material, such sheets having been obtained by placing stainless fibers $8\mu$ in mean diameter on one surface of a sheet of 20 mesh stainless wire gauze at a density of 750g per square meter and sintered.

The capacity of the torso bag was 160l and that of the knee bag was 23l. The maximum pressure reached in the torso bag was $0.18kg/cm^2$, that in the knee bag was $0.6kg/cm^2$, and the time to fully inflate the torso bag was 45 ms.

EXAMPLE 2

An inflation test was carried out using the gas generator shown in FIG. 3, with the chambers operating as the primary stages having different conditions from the other secondary stage chamber and with an ignition lag of 20ms. between the first and second stage ignitions.

Chambers A and C were operated as the primary stages under the same conditions with a charge of 145 grs. of gas generating agent each. The heat absorbing laminations of wire gauze and the porous plate were superposed in 6 layers above the generating agent, each lamination consisting, in order from the bottom of the chamber, of two sheets of 14 mesh wire gauze, a single porous plate having a perforation ratio of 50%, and three sheets of 22 mesh wire gauze. Two filter sheets of sintered metallic fiber similar to those used in Example 1 were placed above the heat absorbing material.

The central chamber B was operated as the secondary stage with a charge of 111 grs. of gas generating agent. The laminations of wire gauze and the porous plate were superposed in 7 layers above the agent, each lamination consisting of two sheets of 14 mesh wire gauze, a single porous plate having a perforation ratio of 50%, and three sheets of 18 mesh wire gauze. The filter sheets were the same as those used in the right and left chambers, and the gas bags were of the same capacity as those used in Example 1. The maximum pressure reached in the torso bag was $0.28kg/cm^2$, that in the knee bag was $0.85kg/cm^2$, and the time to fully inflate the torso bag was 33 ms.

The squib in the secondary stage central chamber can be ignited at a delay interval of from 0 to 40ms after the primary stage ignition, and only the primary stage squibs may be fired when a collision occurs at speeds of less than 40kph.

What is claimed is:

1. A gas generator for an inflatable vehicle safety bag, comprising:
    (a) a generator housing defining three independent chambers,
    (b) an electrical ignition squib mounted in the bottom of each chamber;
    (c) a gas generating agent disposed in each chamber around the squib;
    (d) a heat absorbing and filtering material disposed in each chamber overlying the gas generating agent;
    (e) an apertured diffuser mounted over the open top of each chamber;
    (f) an apertured deflector plate mounted above the diffusers;
    (g) an inflatable knee bag sealingly attached to the deflector plate; and
    (h) an inflatable torso bag sealingly attached to the generator housing surrounding the knee bag, said knee and torso bags being disposed to receive gases generated in the respective chambers.

2. A gas generator as defined in claim 1, wherein the gas generating agent comprises a mixture of one or more alkali metal azides or alkaline earth metal azides, one or more nitrates of alkali metal or alkaline earth metal, fine particulate silicon dioxide, and fine particulate glass.

3. A gas generator as defined in claim 1, wherein the gas generating agent is sealed in a metal foil cartridge having at least one surface coated with a synthetic thermo-plastic resin.

4. A gas generator as defined in claim 1, wherein the heat absorbing and filtering material comprises a plurality of laminar sheets of wire gauze superposed one upon another, a porous plate interposed substantially in the middle of the wire gauze sheets, and a sintered metallic body underlying the diffuser.

5. A gas generator as defined in claim 4, wherein the laminar wire gauze sheets comprise 10 to 30 mesh wire gauze, and the porous plate has a thickness of 0.5mm and a perforation ratio of 30 to 60%.

6. A gas generator as defined in claim 4, wherein the sintered metallic body comprises stainless steel fibers $8\mu$ in mean diameter disposed on one surface of a sheet of 14 to 22 mesh wire gauze at a density of 500 to $1,500grs/m^2$ and sintered.

7. A gas generator as defined in claim 1, wherein the deflector plate is disposed substantially parallel to the surface of the generator housing above the diffusers and at a given spacing therefrom.

8. A gas generator as defined in claim 1, wherein the chambers are aligned, the squibs in the two end chambers are adapted to be simultaneously ignited first, and the squib in the central chamber is adapted to be ignited after a time interval of from 0 to 40ms.

9. A gas generator as defined in claim 8, wherein only the end chamber squibs are ignited when a collision occurs at a speed of less than 40kph.

* * * * *